Sept. 15, 1925.
L. FLEISCHER
AUTOMOBILE BRAKING DEVICE
Filed Dec. 31, 1924
1,554,078
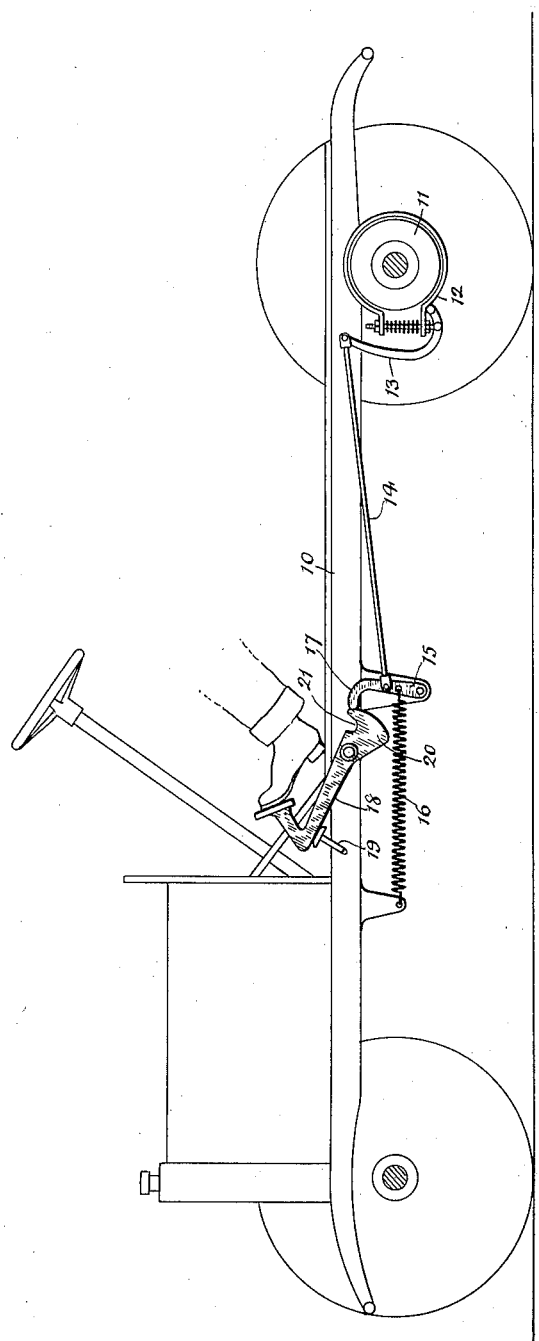
WITNESSES
H. T. Walker
Robert I. Hulsizer
INVENTOR
Louis Fleischer
BY
ATTORNEYS Patented Sept. 15, 1925.

1,554,078

UNITED STATES PATENT OFFICE.

LOUIS FLEISCHER, OF NEW YORK, N. Y., ASSIGNOR OF SEVENTY-FIVE ONE-HUN-DREDTHS TO REGINALD BERKOWITZ AND TWENTY-FIVE ONE-HUNDREDTHS TO SAMUEL SOLOMON, BOTH OF NEW YORK, N. Y.

AUTOMOBILE BRAKING DEVICE.

Application filed December 31, 1924. Serial No. 759,117.

*To all whom it may concern:*

Be it known that I, LOUIS FLEISCHER, a citizen of the United States, and a resident of the city of New York, borough of Bronx, in the county of Bronx and State of New York, have invented a new and Improved Automobile Braking Device, of which the following is a full, clear, and exact description.

This invention relates to an automobile braking device. An object of the invention is to provide a braking mechanism for an automobile which will be applied instantly when the foot is released from the accelerator pedal.

Another object is to provide a braking device which will be released as soon as the foot is applied beyond a definite degree to the accelerator pedal of an automobile.

A further object resides in the provision of means whereby to apply the brakes of an automobile the operator does not have to move his foot from one pedal to the brake pedal, as is now the case.

A still further object resides in the provision of means whereby the entire action of the operator with respect to the application and release of the brakes and the operation of the accelerator pedal takes place merely upon a slight movement in one or the other direction of his foot.

The invention is illustrated in the drawing, which is a simple diagrammatic representation of an automobile with the device applied thereto.

The form of the invention shown in the drawing is a preferred form, although it is understood that modifications in the construction and arrangement of the parts and in the character of the materials used may be adopted without departing from the spirit of the invention as set forth in the appended claims.

The invention is shown in the drawing applied to an automobile frame 10 having a brake drum 11, a brake band 12 and a brake lever 13 connected to a link 14 which is connected to a brake arm 15. This brake arm is pivoted to the frame and connected to a spring 16 tending normally to move the arm so that the brake will be applied. The upper end 17 of the arm 15 is curved laterally and lies adjacent an accelerator pedal 18 which is adapted to operate an accelerator arm 19. This accelerator pedal 18 is pivoted to the frame, and one end 20 is in the form of a cam having a slot 21 therein. The cam 20 is shoe shaped that when the pedal 18 is depressed the engagement of the cam with the end 17 and the arm 15 will force the arm back against the action of the spring 16 to release the brakes. This release of the brakes by reason of the shape of the cam is effected while the accelerator arm 19 is being depressed and also while the car is "driving." The instant the foot is taken off the accelerator pedal, the action of the spring causes the application of the brakes and the end 17 of the arm 15 slides into the slot 21, thus permitting the spring to become effective.

What I claim is:—

1. In combination, an automobile brake, a lever system connected thereto, a spring associated with the lever system and normally tending to apply the brakes, an accelerator pedal, and means connected with the pedal to release the brakes against the action of the spring when the pedal is depressed.

2. In combination, an automobile brake, a lever system connected thereto, a spring associated with the lever system and normally tending to apply the brakes, an accelerator pedal, and a cam element connected with the pedal to release the brakes against the action of the spring when the pedal is depressed.

3. In combination, a brake, a link connected thereto, a brake arm, a spring connected to said arm and tending normally to apply the brakes, an accelerator pedal, a cam on said pedal adapted to engage the brake arm when the pedal is depressed, said cam having a slot therein into which the end of the brake arm moves when the pedal is released whereby the tendency of the spring to apply the brakes becomes effective.

LOUIS FLEISCHER.